US009438896B2

(12) United States Patent
Herrmann

(10) Patent No.: US 9,438,896 B2
(45) Date of Patent: Sep. 6, 2016

(54) METHOD FOR DRIVING 3D BINOCULAR EYEWEAR FROM STANDARD VIDEO STREAM

(75) Inventor: Frederick P. Herrmann, Sharon, MA (US)

(73) Assignee: Kopin Corporation, Westborough, MA (US)

( * ) Notice: Subject to any disclaimer, the term of this patent is extended or adjusted under 35 U.S.C. 154(b) by 334 days.

(21) Appl. No.: 12/945,976

(22) Filed: Nov. 15, 2010

(65) Prior Publication Data

US 2011/0181707 A1    Jul. 28, 2011

Related U.S. Application Data

(60) Provisional application No. 61/261,104, filed on Nov. 13, 2009.

(51) Int. Cl.
*H04N 13/04* (2006.01)

(52) U.S. Cl.
CPC ........ *H04N 13/044* (2013.01); *H04N 13/0497* (2013.01)

(58) Field of Classification Search
USPC ............ 348/565, 569; 709/231; 375/240.026
See application file for complete search history.

(56) References Cited

U.S. PATENT DOCUMENTS

| | | | | |
|---|---|---|---|---|
| 5,075,776 A | * | 12/1991 | Cheung | 348/208.2 |
| 5,416,510 A | * | 5/1995 | Lipton et al. | 348/43 |
| 5,523,886 A | * | 6/1996 | Johnson-Williams et al. | 359/464 |
| 5,612,708 A | * | 3/1997 | Ansley | G02B 27/017 340/980 |
| 5,677,728 A | * | 10/1997 | Schoolman | A61B 6/462 348/14.01 |
| 5,751,341 A | * | 5/1998 | Chaleki et al. | 348/65 |
| 5,808,591 A | * | 9/1998 | Mantani | 345/82 |
| 6,268,880 B1 | * | 7/2001 | Uomori et al. | 348/47 |
| 6,437,767 B1 | * | 8/2002 | Cairns et al. | 345/100 |
| 6,518,939 B1 | * | 2/2003 | Kikuchi | 345/8 |
| 6,573,819 B1 | * | 6/2003 | Oshima | G11B 20/00007 348/51 |
| 6,636,185 B1 | * | 10/2003 | Spitzer et al. | 345/8 |
| 6,853,935 B2 | | 2/2005 | Satoh et al. | |
| 6,977,629 B2 | * | 12/2005 | Weitbruch et al. | 345/6 |
| 7,844,001 B2 | * | 11/2010 | Routhier et al. | 375/240.25 |
| 8,253,760 B2 | * | 8/2012 | Sako et al. | 345/629 |
| 8,754,931 B2 | | 6/2014 | Gassel et al. | |
| 2001/0043266 A1 | * | 11/2001 | Robinson et al. | 348/53 |
| 2003/0080964 A1 | * | 5/2003 | Prache | 345/531 |
| 2005/0117637 A1 | * | 6/2005 | Routhier | H04N 13/0029 375/240.01 |
| 2006/0241792 A1 | | 10/2006 | Pretlove et al. | |

(Continued)

FOREIGN PATENT DOCUMENTS

CN    101563722    10/2009

OTHER PUBLICATIONS

International Preliminary Report on Patentability and Written Opinion of PCT/US2010/056671 dated May 24, 2012.

(Continued)

*Primary Examiner* — Christopher S Kelley
*Assistant Examiner* — Asmamaw G Tarko
(74) *Attorney, Agent, or Firm* — Hamilton, Brook, Smith & Reynolds, P.C.

(57) ABSTRACT

A video eyewear device in which parallel side-by-side video signals are driven as analog signals to the left and right displays, with timing controlled by a common sampling clock. A left display sampling clock burst occurs during an active video period and the right display burst occurs during the same portion of the active video period.

20 Claims, 7 Drawing Sheets

(56) References Cited

U.S. PATENT DOCUMENTS

| | | | |
|---|---|---|---|
| 2006/0256140 A1 | 11/2006 | Turner | |
| 2007/0120763 A1* | 5/2007 | De Paepe | G06F 3/03547 345/1.3 |
| 2007/0247477 A1* | 10/2007 | Lowry | H04N 13/0438 345/629 |
| 2007/0296713 A1* | 12/2007 | Kim et al. | 345/204 |
| 2008/0062143 A1 | 3/2008 | Shahoian et al. | |
| 2008/0122736 A1* | 5/2008 | Ronzani et al. | 345/8 |
| 2008/0152072 A1* | 6/2008 | Herrmann | G11C 19/28 377/74 |
| 2008/0259096 A1 | 10/2008 | Huston | |
| 2009/0002482 A1* | 1/2009 | Cho et al. | 348/43 |
| 2009/0185030 A1* | 7/2009 | McDowall et al. | 348/53 |
| 2009/0219382 A1* | 9/2009 | Routhier et al. | 348/43 |
| 2009/0251531 A1* | 10/2009 | Marshall et al. | 348/42 |
| 2010/0157029 A1* | 6/2010 | MacNaughton | H04N 13/0438 348/53 |
| 2010/0271462 A1* | 10/2010 | Gutierrez Novelo | 348/43 |
| 2010/0309291 A1* | 12/2010 | Martinez et al. | 348/47 |
| 2011/0012845 A1 | 1/2011 | Rothkopf et al. | |
| 2011/0169928 A1* | 7/2011 | Gassel et al. | 348/53 |
| 2011/0181707 A1* | 7/2011 | Herrmann | 348/53 |
| 2011/0187821 A1* | 8/2011 | Routhier et al. | 348/43 |
| 2011/0187840 A1* | 8/2011 | Chao et al. | 348/53 |
| 2011/0292169 A1* | 12/2011 | Jain | 348/43 |
| 2011/0292170 A1* | 12/2011 | Jain | 348/43 |
| 2012/0062710 A1* | 3/2012 | Lee et al. | 348/51 |
| 2012/0176411 A1 | 7/2012 | Huston | |

OTHER PUBLICATIONS

Notification of Transmittal of the International Search Report and the Written Opinion of the International Searching Authority for Int'l Application No. PCT/US2010/056671; Date Mailed: Jan. 12, 2011.

* cited by examiner

METHOD FOR DRIVING 3D BINOCULAR EYEWEAR FROM STANDARD VIDEO STREAM

RELATED APPLICATION

This application claims the benefit of U.S. Provisional Application No. 61/261,104, filed on Nov. 13, 2009, the entire teachings of which are incorporated herein by reference.

BACKGROUND OF THE INVENTION

Consumer Video Devices

Consumers are increasingly using portable devices such as the Apple™ iPod™ Touch™, or smart phones such as the iPhone™ and Google™ Android™ devices to store (or access via the web) television programs, movies, and other video content. The small form factor for these devices is conveniently carried in one's pocket. However, the small screen size can provide a less than ideal viewing experience.

Head-mounted displays have been known for quite some time. Certain types of these displays are worn like a pair of eyeglasses. They may have a display element for both the left and right eyes to provide stereo video images. They may be designed to present a smoked-plastic "sunglasses" look to the outside world. Products on the market today can provide a reasonably immersive viewing experience in a small, portable, compact form factor, providing a "big screen" experience while at the same time remaining compatible with the portability of iPods and smart phones.

In these head mounted display devices, the optical imaging path for each eye typically consists of a Light Emitting Diode (LED) for backlight illumination, a polarizing film, and a micro-display Liquid Crystal Display (LCD) element in a molded plastic package. Among the pieces in the optical path, the micro-display element typically takes center stage. Suitably small color LCD panels are available from sources such as Kopin Corporation of Taunton, Mass. Kopin's displays such as the CyberDisplay® models can provide QVGA, VGA, WVGA, SVGA and even higher resolution depending on the desired quality of the resulting video.

Stereoscopic 3D Techniques

At the same time, full size flat panel televisions are increasingly available for viewing content in three dimensions. This is causing a corresponding increase in the availability of 3D content, making it desirable to view such content on portable devices as well.

Stereoscopy is a method of displaying three-dimensional images by presenting slightly different views to the left and right eyes. The most common methods use a single screen or display device, combined with some optical means to separate the images for left and right eyes. These methods include:

1. An anaglyph technique in which viewers wear glasses with colored filters (commonly red and cyan).
2. A similar technique using passive eyewear with oppositely-polarized filters (linear or circular).
3. Active shutter glasses synchronized to a display device showing interleaved left and right fields.
4. Auto-stereoscopic techniques in which eyewear is not required because the optical separation is performed on the display itself, typically with prismatic optics to control the emission angle and steer light to left and right eyes.

All of the above techniques are to some degree subject to crosstalk artifacts, in which each eye receives some light intended for the other. These artifacts reduce the perceived quality of the 3D image.

An alternative technique eliminates inter-eye crosstalk entirely, by using separate microdisplays in binocular eyewear. The eyewear is constructed such that each eye focuses on a single display, and the two displays are driven with separate video signals.

Stereo Video Signals and Formats

The installed base of video electronic equipment includes very little support for stereoscopic 3D. In most cases, it is therefore more desirable to adapt existing 2D equipment, signals, and formats to handle 3D content. Some methods include:

1. Spatial separation (top-and-bottom or side-by-side)
2. Spatial interleave (even/odd rows or columns)
3. Temporal interleave (alternate frames or fields)

Various formats have proliferated as each display system has chosen the method most advantageous for the particular display technology used.

YouTube™ has introduced support for 3D video, and has selected "cross-eyed side-by-side" as its standard format for uploads. (The YouTube web site provides options for various other formats on playback.) Because of the vast popularity of YouTube, this format may become a de facto standard for exchanging 3D content.

The crossed-eyed side-by-side format splits the image into left and right halves, and places left-eye data in the right half image and right-eye data in the left half image. The "parallel" side-by-side format puts left and right images in their corresponding halves. Both formats are well-suited for display on video eyewear, as format conversion can be accomplished without use of a frame buffer memory.

Various approaches have also been taken in the past to adapt eyewear to handle streaming video. FIG. 1 is a high level block diagram of a typical prior art 2D video eyewear system. The drive electronics 20 receives an input video stream 10 (digital or analog), and performs any necessary signal processing (e.g., scaling, deinterlacing, color space conversion, gamma correction, etc.). It outputs video signal(s) 30 suitable for the two displays 50-L, 50-R, which in the case of the above-mentioned liquid crystal display (LCD) based video eyewear, may be a plurality of analog signals at an appropriate voltage range. For example, the video signals 30 may include separate red, green and blue (R G B) channel outputs. The drive electronics 20 also outputs digital clock and control signals 40 to the displays 50, which in the case of an LCD will typically one or more sampling clock signals.

FIG. 2 is a high level timing diagram for such a 2D system showing the video output stream 30 and a sampling clock signal 40-1 in more detail. The horizontal period 60 is the time necessary to scan one row of the display (typically 31.7 μs for a 480p format video signal), and comprises an active video period 61 and an inactive "retrace" period 62. The sampling clock(s) 40-1 are toggled (or "burst") during the active period 61 (and on some displays, also during the retrace period 62). Please note that the sampling clock is not to scale, as there would typically be one clock per pixel, and thus hundreds of clocks per horizontal period 60. In this 2D system, identical video 30 and control 40 signals are presented to both left 50-L and right 50-R displays, which therefore display identical images.

In a prior art implementation of eyewear adapted for showing 3D video, both displays also receive the same video signals 30, but they are driven with separate control signals 42-L, 42-R, as illustrated in FIGS. 3 and 4. For example, if the input 3D video is in a "side-by-side" format, the control signals 42-L, 42-R are typically modified from the 2D case, so as to select different portions of the input video signal for each eye.

Comparing FIG. 2 with FIG. 4, note that in this prior art implementation of a 3D system the horizontal period 60 remains the same as for the 2D case, but that the 3D implementation requires approximately double the sampling frequency to accomplish a 1:2 scaling operation by resampling the analog signal. (The frequency may be varied somewhat to achieve other scaling ratios as needed.) Therefore, the drive electronics 20 must be modified to support this approach; or else the higher bandwidth may compromise display performance.

This method may be adapted to other formats. The adaptations may include:
  The cross-eyed side-by-side format can be supported by reversing the roles of left and right clocks.
  A column-interleaved format can be supported by using two clocks of opposite phase and the same frequency as the input.

SUMMARY OF THE INVENTION

The present invention is a technique to drive three dimensional video eyewear from various format input video streams. In one embodiment, a common sampling clock is used to drive both a left and right display in parallel.

More particularly, a video eyewear device capable of displaying three dimensional video content receives a digital video signal having encoded therein information to be displayed on a left and right display. Left channel and right channel video driver provide a separate left and right video signal to each of the respective left and right displays. A clock signal applied to the left and right video drivers, such that an active sampling clock period for the left video driver occurs during the same time as an active sampling clock period for the right video driver.

In one configuration, a left and right digital scaler are connected to receive a the respective left and right digital video streams, to apply a horizontal scale factor. The scale factor may depend on a ratio of the number of pixels in a horizontal line of one of the displays divided by the number of pixels in a horizontal line of the input digital video signal. The scalers may repeat pixels, or use linear or other pixel interpolation techniques. When the input signal is a color signal having three color channels, the scaling is performed independently for each channel, and for each eye.

In still other embodiments, a pixel position shifter may shift at least one of the left or right digital video signals horizontally with respect to one another. Such adjustments may be desirable to accommodate variations in the video source material or in the viewer's Inter-Pupillary Distance (IPD).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In a first example embodiment, the left and right displays of a head mounted video eyewear apparatus are driven with two respective video signals that are derived from an input video stream. The control signals, such as sampling clock inputs, to the two displays may be identical, and may have a clock period that is the same as for displaying 2D content.

Figure 1:
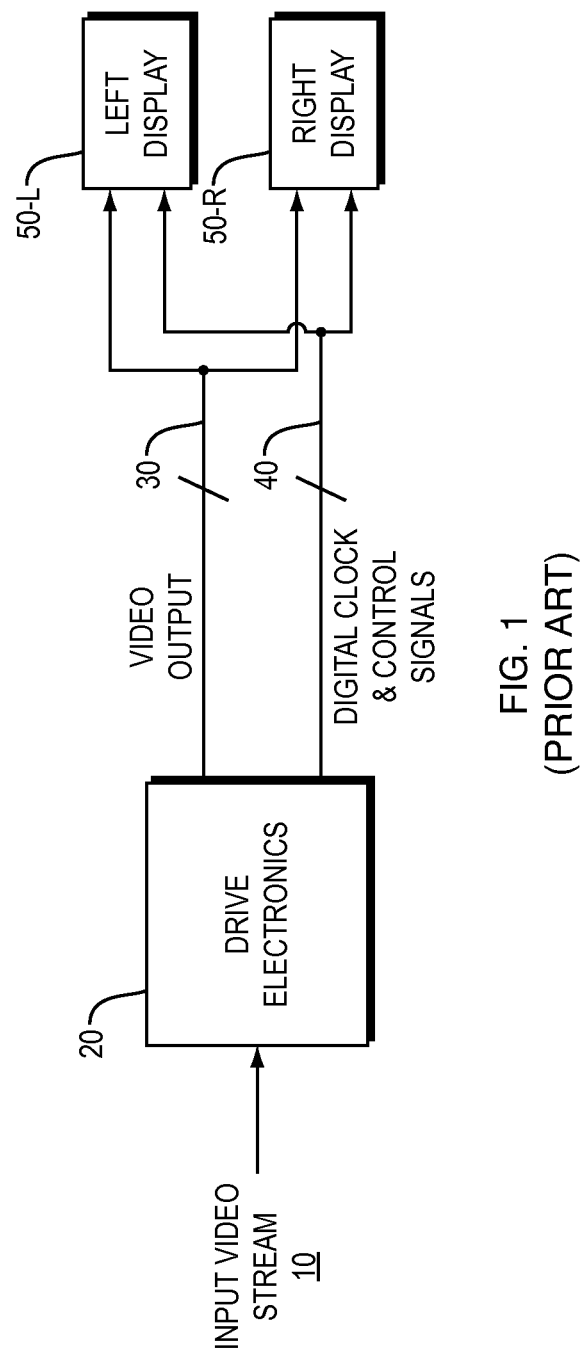
FIG. 1 is a high level block diagram of a prior art two-dimensional video eyewear system.
Figure 2:
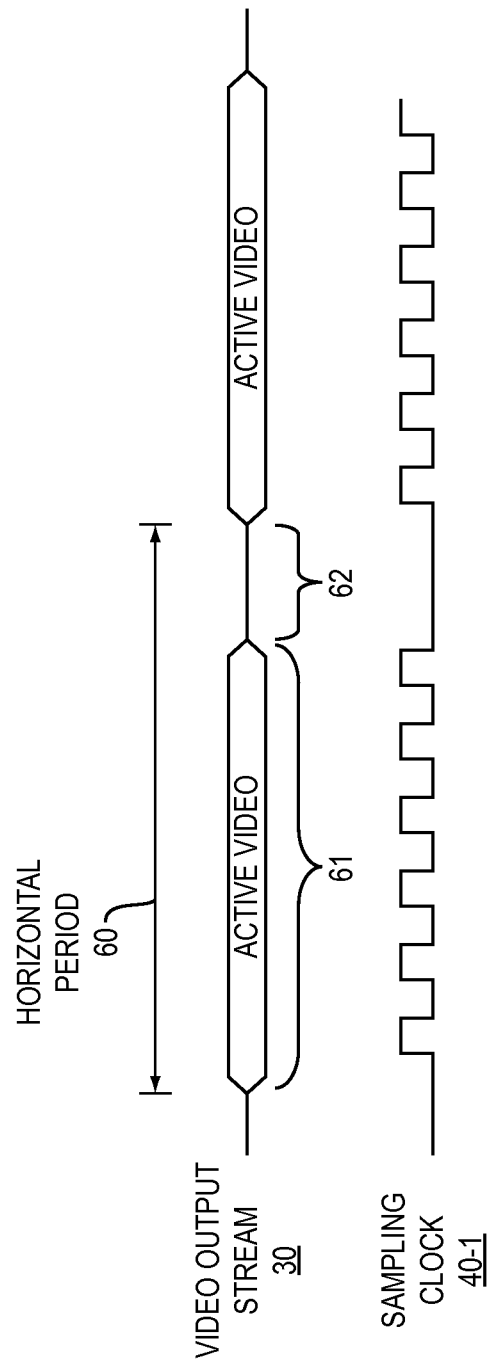
FIG. 2 is a high level timing diagram for the prior art system of FIG. 1.
Figure 3:
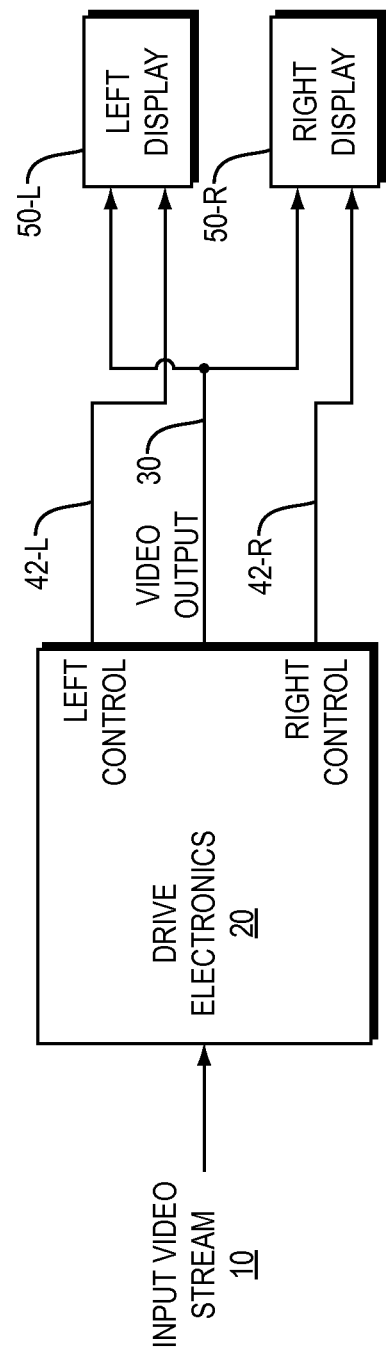
FIG. 3 is a high level block diagram of a prior art three-dimensional video eyewear system.
Figure 4:
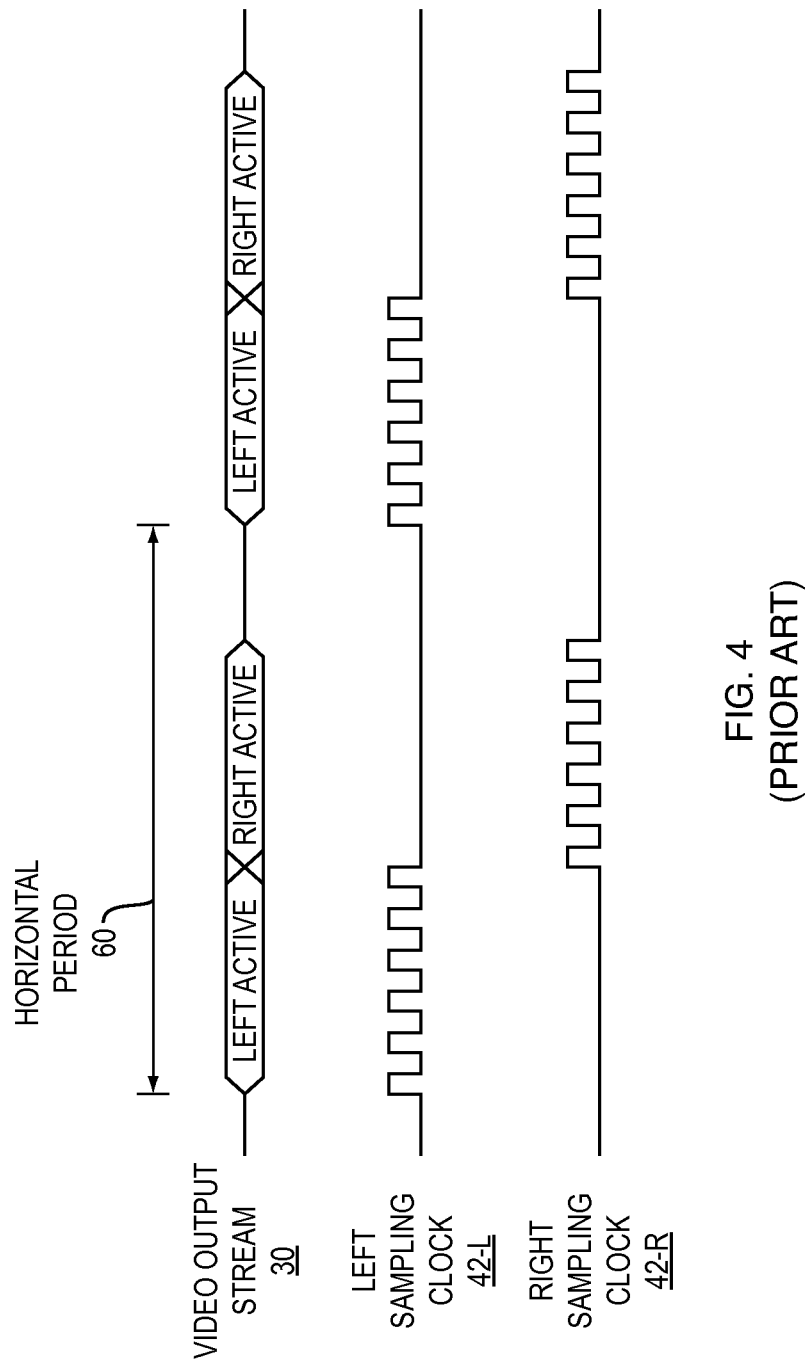
FIG. 4 is a high level timing diagram for the prior art system of FIG. 3.
Figure 5:
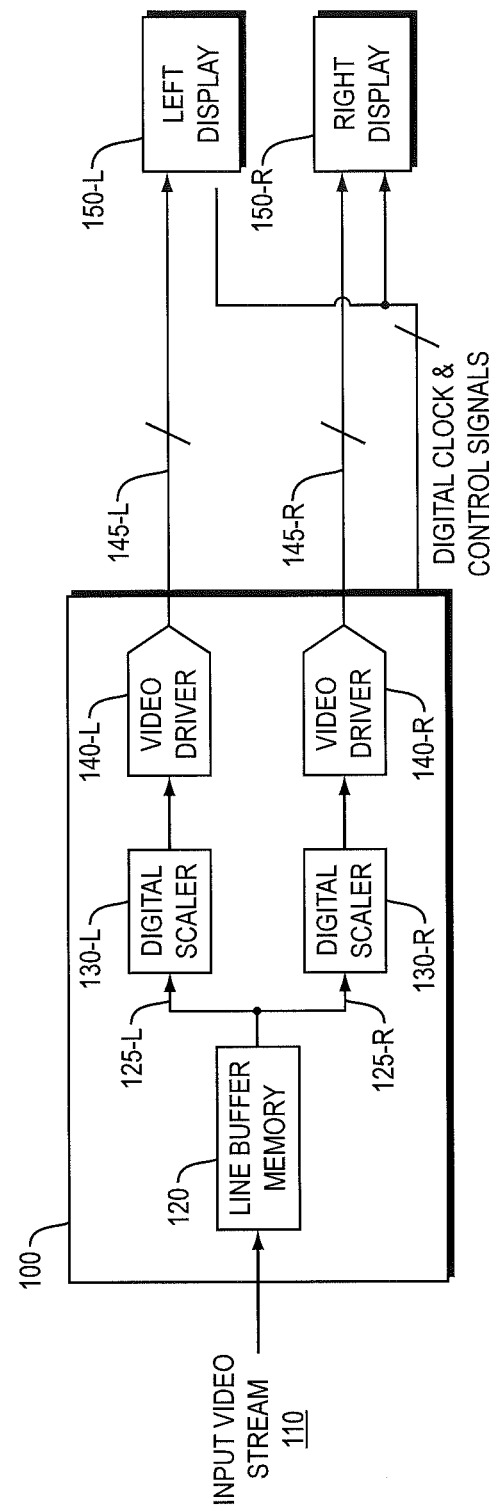
FIG. 5 is a high level block diagram of a three-dimensional video eyewear system according to one example embodiment of this invention.

FIG. 5 is a block diagram of one such example implementation, with additional details shown in the drive electronics block 100. The incoming video signal 110 is here assumed to already be a digital video signal (if analog, however, an A/D conversion step (not shown) is included in the drive electronics 100). Each row of input video is first written to a line buffer memory 120. The contents of the line buffer memory are read out in two streams 125-L, 125-R (one each for the left and right video channels), to a pair of digital scalers 130-L, 130-R. The two scaled video signals feed a pair of video drivers 140-L, 140-R, which in turn feed left 150-L and right 150-R display elements.

In one embodiment, the displays 150-L, 150-R may each be a Kopin CyberDisplay® WVGA LVS Display with an 854×480 resolution in a 0.44" diagonal form factor size. Such a display 150 may be driven by a video driver 140 such as Kopin's KCD-A251 display driver Application Specific Integrated Circuit (ASIC).

In this embodiment, the input video stream 110 may be a 480p color digital video signal with the pixels arranged in a "side by side" format. The color digital video signal further consists of 3 channels (R, G, B), each channel having 8 bits of resolution.

In this case, the line buffer memory 120 is 24 bits wide. The line buffer 120 may be implemented as a single buffer, a double buffer, or a pair of FIFOs. The buffer 120, of whatever design, is often small enough to fit in an FPGA or similar programmable logic device, and may be integrated with other components of the display control logic.

In this example embodiment, there are a total of six digital scalers 130 used (one each for the R, G, B channels for each of the left and right displays), since interpolation of each color channel is preferably done separately from the other channels. Digital scalers 130 "make up" the difference in horizontal resolution between the higher resolution display and now lower resolution input signal fed to each eye. Digital scalers 130 can be implemented as a simple repetition of pixels in the horizontal resolution of the input video stream 110 and the two displays 150. In a case where the scale factor is a simple integer reciprocal (such as 2:1), scaling 130 can be implemented as a simple repetition of pixels. However, in other cases, where the scale factor is not an integer reciprocal, more complicated scaling techniques such as linear interpolation may be used. In either case, scalers 130 are preferably implemented in the digital domain, which may achieve better results than possible with the prior art methods of resampling an analog signal.

Some example considerations for the digital scalers 130 include the following:

A standard 2D video stream at 480p resolution is typically encoded with 720 active, "non-square" pixels per horizontal line. For the 3D "side-by-side" input video stream format, there are then 360 pixels available for each eye. The appropriate scaling ratio is slightly greater than in this case (2:1), if the images are cropped for presentation on a pair of wide VGA (WVGA) (864×480) displays. Consider first that some pixels may be omitted from the input stream. For example, SMPTE RP-187 specifies a clean aperture 708 pixels wide, of 720 available. In practice, a 704-pixel aperture is commonly used, which in the side-by-side format results in 352 of 360 pixels being available for each of the left and right input streams. In addition, it is possible that, say, only 854 of the 864 pixels in each output display 150 are available. In that case, the horizontal aspect ratio implemented by scalers 130 aspect ratio might be 854/352 or about 80/33, slightly greater than (2:1).

In another implementation, the input video stream is a 720p resolution color video signal with 1280 active square pixels per horizontal line. When 3D "side-by-side" stereo encoding is used with this input video stream, an exact (2:1) scaling ratio is appropriate for driving two 640×720 half input images, to a corresponding pair of 1280×720 displays. In this example, all pixels are available in both the input stream and on the display.

Also using the standard 1280×720p format, a horizontal scaling ratio of 4:3 may be used to prepare two half images of (approximate) size 854×720. If vertical scaling by 2:3 is also performed, then the 854×480 output may be displayed on a pair of wide VGA displays.

A simple method of vertical scaling is line skipping, which in this case would skip every third line to produce 2 output lines for every three input lines. The resulting image artifacts may be unacceptable in many applications. However, an advantage of line skipping over other methods is that it does not require additional memory.

Better scaling results may be obtained by interpolating between successive lines, or by higher-order spatial filtering over multiple lines. In this case the line buffer of FIG. 5 would be expanded to accommodate multiple lines. The same memory may be used for both the horizontal and vertical scaling.

The standard 1080p video format has 1920 active square pixels per horizontal line. When a 3D "side-by-side" stereo is used with this type of input signal, a (2:1) scaling ratio is also appropriate for driving the two 960×1080 half images to a pair of 1920×1080 displays.

After undergoing any necessary scaling by scalers 130-L, 130-R, the output streams pass to the left and right display drivers 140-L and 140-R. Each display driver 140 typically includes one or more D/A converters and one or more video amplifiers.

Figure 6:
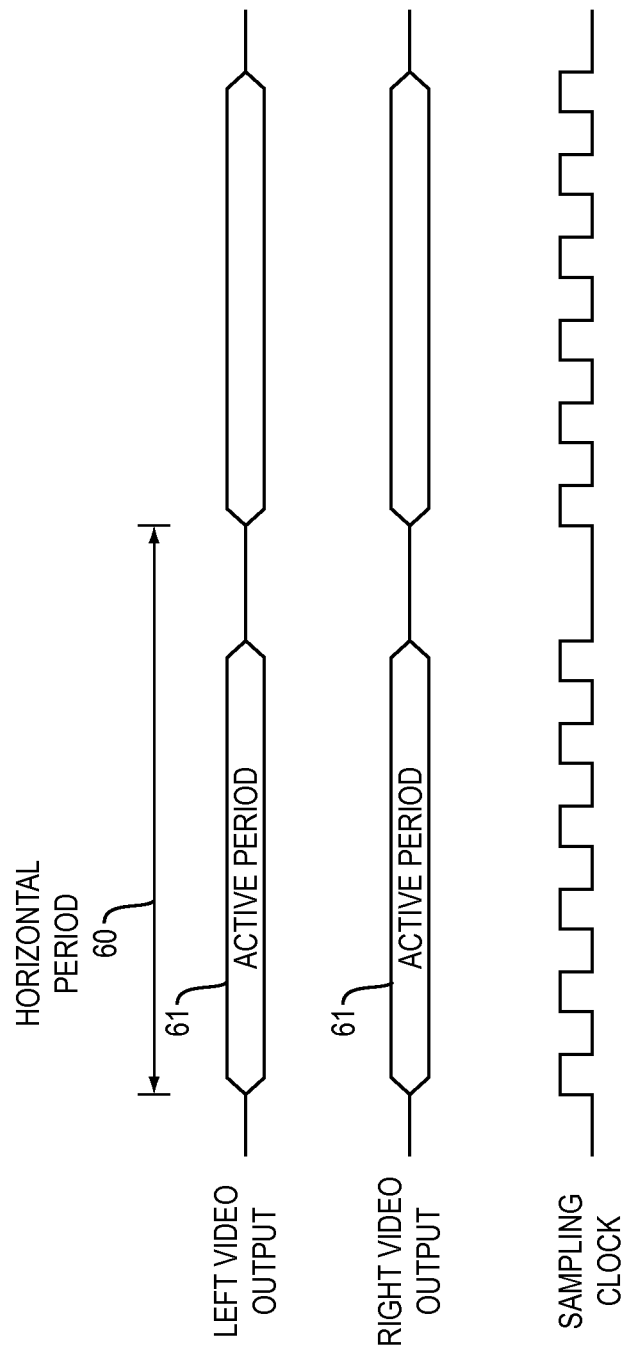
FIG. 6 is a timing diagram for the example embodiment of FIG. 5.

FIG. 6 presents a timing diagram for this example implementation. The sampling clock frequency need not be doubled as in the prior art methods. The new method therefore does not increase the bandwidth requirement to the standard format displays, and therefore display performance is undiminished.

Selective Switching Between 2D and 3D Modes

In another embodiment, the 3D system may be selectively switched to a 2D mode by changing the scaling factor in the digital scalers. That is, instead of applying interpolation, the same buffer output, without scaling, is sent to each display 150-L, 150-R.

Soft IPD and Convergence Adjust

In another implementation, any of the 3D methods described above may be adapted to provide soft Inter-Pupilliary Distance (IPD) or convergence adjustments.

In particular, it is not uncommon for the available resolution of the physical displays 150 to exceed that of the presented image in the input stream 110. For example "wide VGA" displays such as the Kopin CyberDisplay® WVGA mentioned above may have up to 864 active columns, but are often used to display content with horizontal resolutions of only 854, 768, 720, or 640 pixels. In these situations, the drive electronics 100 will typically center the active image horizontally and drive the inactive "side" pixel columns to black. However, by varying the size of the resulting left and right black borders, the position of the image can be moved horizontally within the active pixel array.

Because the 3D methods described provide independent signals to the two displays, it is possible to control the border sizes on left and right displays independently. For example, moving the left image to the right and the right image to the left would change the stereoscopic convergence and make the image appear closer to the viewer. In this way, the convergence of the stereoscopic images may be adjusted for optimal viewing via electronic controls, without requiring mechanical adjustments to the display or lens position. Such adjustments may be desirable to accommodate variations in the video source material or in the viewer's Inter-Pupiliary Distance (IPD). This can then affect the 3D depth perceived by the viewer.

Figure 7:
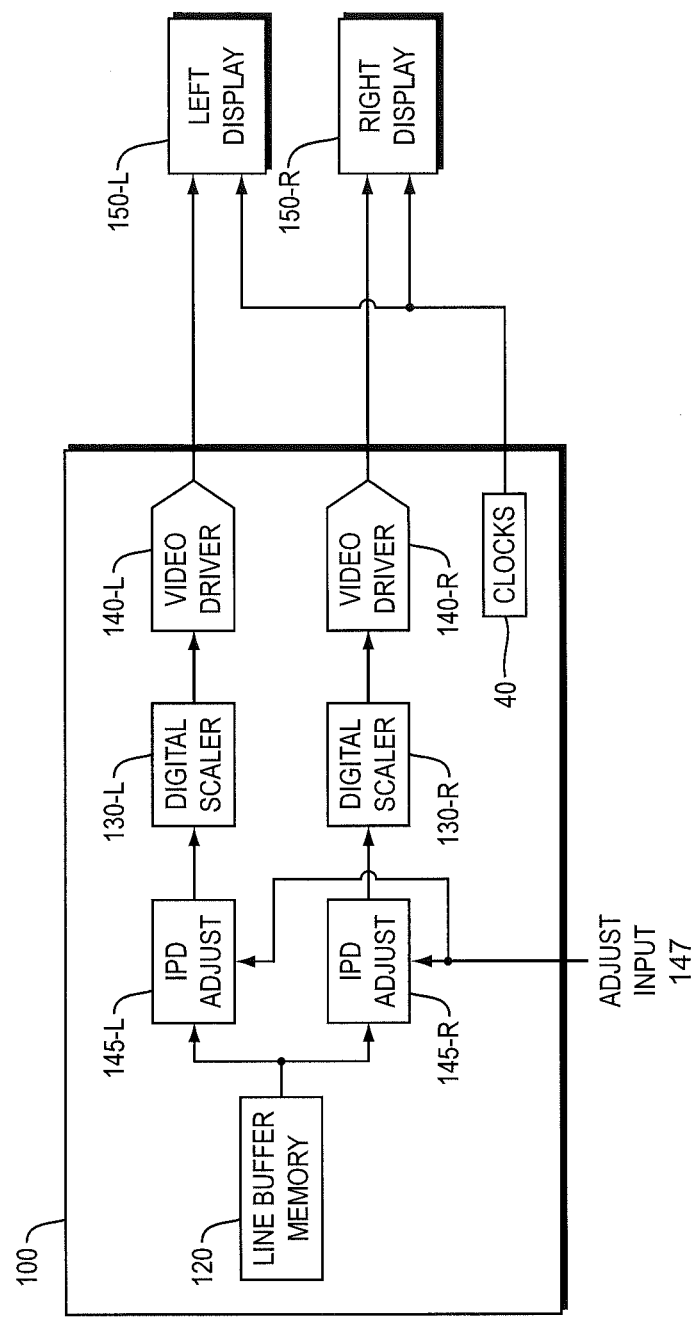
FIG. 7 is high level block diagram of an Inter-Pupilliary Distance implementation.

In such an embodiment, as shown in FIG. 7, IPD adjustment 145-L, 145-R can be applied by shifting horizontal line of pixels for the left and right eye with respect to one another. The user may be provided with an input to control the amount of IPD shift via an input 147, such as a thumb wheel or other setting input, which, in turn, controls the shift amount.

It should be understood that the IPD adjustment need not depend on a particular scale factor, and indeed can be applied to other 3D video eyewear systems such as the systems that do not apply scale factors at all. The horizontal shift may be performed before or after scalers 140-L, 140-R such as by changing the address from which the digital scalers 140-L, 140-R read from the line buffer memory 120 (as shown in FIG. 7) or by shifting the pixels in each eye after they are output by the scalers 140-L, 140-R. As long as such systems produce separate video input streams for the left and right displays, the IPD adjust technique can be used.

While this invention has been particularly shown and described with references to example embodiments thereof, it will be understood by those skilled in the art that various changes in form and details may be made therein without departing from the scope of the invention encompassed by the appended claims.

What is claimed is:

1. A video eyewear device comprising:
   a head-mounted eyewear, configured to host:
   a receiver, for receiving a digital video stream having encoded therein three-dimensional video information;
   a left display;
   a right display;
   a left video driver and a right video driver, each coupled to the receiver for receiving the digital video stream, and providing a left video signal to the left display and a right video signal to the right display; and
   a timing controller, for generating a pixel sampling clock signal to be applied to the left video signal at the left display and the right video signal at the right display, such that an active pixel sampling clock period for the left video driver occurs during the same time as an active pixel sampling clock period for the right video driver.

2. The device of claim 1 additionally comprising:
   a left and right digital scaler connected to receive a respective left and right digital video stream, to apply a horizontal scale factor to the left and right digital video streams, and to provide respective inputs to the left and right video drivers.

3. The device of claim 2 additionally comprising:
   a line buffer memory coupled to an input video stream, and to provide the left and right digital video streams.

4. The device of claim 3 wherein a scale factor applied by the digital scalers depends on a number of pixels in an horizontal scan line of at least one of the left and right displays and one half a number of pixels in a horizontal scan line of the input video stream.

5. The device of claim 2 wherein the left and right digital scalers use linear interpolation.

6. The device of claim 2 wherein the input video stream includes at least three channel color video, and the digital scalers are applied to the pixels for a given color channel independently of the other color channels.

7. The device of claim 1 further comprising:
   a pixel position shifter, for shifting at least one of the digital video signals at the left video driver and the digital video signals at the right video driver with respect to one another.

8. The device of claim 1 further comprising:
   a pixel position shifter coupled to the left and right video drivers for shifting at least one of left or right digital video signals to control either the point of convergence or inter pupil distance.

9. A video eyewear device comprising:
   a head-mounted eyewear, configured to host:
   a receiver, for receiving a digital video stream having encoded therein three-dimensional video information;
   left and right displays;
   a left video driver and a right video driver, each coupled to the receiver for receiving the digital video stream, and providing a left video signal to the left display and a right video signal to right display; and
   a pixel position shifter, for shifting at least one of the left or right digital video signals with respect to one another.

10. The device of claim 9 wherein the pixel position shifter accepts an input signal indicating adjustment to at least one of a desired Interpupilary Distance (IPD) or point of convergence.

11. A method of driving 3-dimensional binocular eyewear from a standard video stream, the method comprising:
    at a subject 3-dimensional binocular eyewear having a left display and a right display:
    receiving an input digital video stream having encoded therein three-dimensional video information;
    from the received digital video stream, providing a left video signal to the left display and a right video signal to the right display said providing the left video signal to the left display being by a left video driver and providing right video signal to the right display being by a right video driver; and
    causing an active pixel sampling clock period associated with the left video driver to occur during the same time as an active pixel sampling clock period associated with the right video driver.

12. The method of claim 11 further comprising:
    applying a horizontal scale factor to a left and right digital video streams using a left and right digital scaler, respectively, and providing respective inputs to the left and right video drivers.

13. The method of claim 12 further comprising:
    buffering an input video stream using a line buffer memory coupled to the input video stream, and providing the left and right digital video streams from the line buffer memory.

14. The method of claim 13 wherein applying the horizontal scale factor using the digital scalers depends on a number of pixels in a horizontal scan line of at least one of the left and right displays and one half a number of pixels in a horizontal scan line of the input video stream.

15. The method of claim 12 wherein applying the horizontal scale factor using the digital scalers the left and right digital scalers use linear interpolation.

16. The method of claim 12 wherein the input video stream includes at least three channel color video, and applying the horizontal scale factor using the digital scalers is applied to the pixels for a given color channel independently of the other color channels.

17. The method of claim 11 further comprising:
    shifting with respect to one another at least one of the digital video signals at the left video driver and the digital video signals at the right video driver, said shifting using a pixel position shifter.

18. The method of claim 11 further comprising:
    shifting with respect to one another at least one of the digital video signals at the left video driver and the digital video signals at the right video driver, said shifting controlling either the point of convergence or inter pupil distance using a pixel position shifter.

19. A method of driving 3-dimensional binocular eyewear from a standard video stream, the method comprising:
    at a 3-dimensional binocular eyewear, receiving a digital video stream having encoded therein three-dimensional video information, said eyewear having a left display and a right display;
    using a left video driver and right video driver, receiving the digital video stream and providing a left video signal to the left display and a right video signal to the right display; and
    shifting with respect to one another at least one of the digital video signals at the left video driver and the digital video signals at the right video driver, said shifting using a pixel position shifter.

20. The method of claim 19 wherein the shifting using the pixel position shifter accepts an input signal indicating adjustment to at least one of a desired Interpupillary Distance (IPD) or point of convergence.

* * * * *